March 5, 1935.  J. A. WEAVER, JR  1,993,391
UNITARY WIRE CONNECTER
Filed April 6, 1934

INVENTOR
JAMES A. WEAVER, JR.
By Adam E. Fisher
ATTORNEY

Patented Mar. 5, 1935

1,993,391

UNITED STATES PATENT OFFICE 1,993,391

UNITARY WIRE CONNECTER

James A. Weaver, Jr., Webster Groves, Mo.

Application April 6, 1934, Serial No. 719,261

5 Claims. (Cl. 173—263)

This invention relates to frictional wire connecters or clamps, such as are in common use in the construction and repair of electrical installations of various kinds, such as telephone, telegraph, light and power systems, for the purpose of connecting tap, drop or service lines to the main lines or for similar purposes. The present invention more particularly pertains to that form of connecter wherein is employed a longitudinally slotted bolt-like member or keeper with a nut and washer operatively mounted thereupon. One of the principal objects of this present invention is to provide in this species of connecter, the combination with an elongated and longitudinally slotted bolt-like keeper, the slot thereof opening out thru one end as a wire engaging slot and thereby providing the keeper with two spaced legs connected by a head portion, and a nut or like element threadedly engaging the legs of the keeper, of an exteriorly arranged link operatively connecting the nut to the head of the keeper in such manner as to permit the removal of the nut from the keeper in customary manner for the insertion of wires within the slot of the keeper. Another object is to provide in a device of the kind referred to, the combination with an elongated and longitudinally slotted bolt-like keeper and a unitary nut and washer assembly mounted thereon, the washer being rotatable upon the nut and relative thereto, of an exteriorly arranged link connecting the washer with opposite end of the keeper, whereby the washer and nut assembly are retained in unitary and operative relation to the keeper at all times. Still another object is to provide in a wire connecter of the slotted bolt type including a head and extended, spaced and parallel legs, and a nut operatively mounted thereupon, of a link extended exteriorly of the body of the connecter from the head of the bolt at one end and operatively connected with the nut at the opposite end, in such manner as to permit the customary rotation of the nut upon the bolt in the operation of the device while at all times retaining the two in connected, unitary relation.

And a still further object is to provide in a wire connecter of the kind described, the same comprising a head from which are extended two threaded legs in spaced, parallel relation, and a nut or similar element adapted to threadedly engage the legs of the connecter, of a link extended exteriorly of the connecter and connected at its ends with the head of the connecter and the nut respectively, in such manner as to permit the nut or equivalent element to engage the legs of the connecter in the usual operative manner while retaining the elements in unitary connection or assembly.

With the foregoing and such other objects and advantages in view as may be developed in the following specification, attention is now directed to the accompanying drawing as constituting a part of the specification, the same embodying certain preferred forms of the invention, and wherein.

Figure 1:
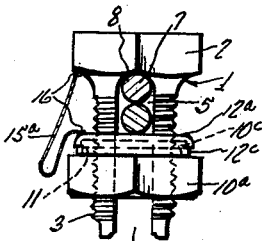
Figure 1 is a side elevation of one preferred embodiment of the invention, showing an exteriorly threaded, slotted keeper, a nut and washer assembly mounted thereupon, and an exteriorly arranged, flexible link or wire connecting the washer with the head of the keeper.
Figure 3:
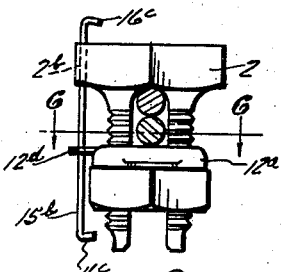

Figure 3 is a side elevation of a modified form of the invention, the elements being arranged generally as in Figure 1, except that in lieu of the flexible link there shown, a stiff link or pin is substituted, the margin of the head of the keeper being apertured to slidably pass the pin as the nut is threaded upon the keeper, and the washer being provided similarly with an apertured extension or ear for slidably engaging the opposite end of the pin.

Figure 4:
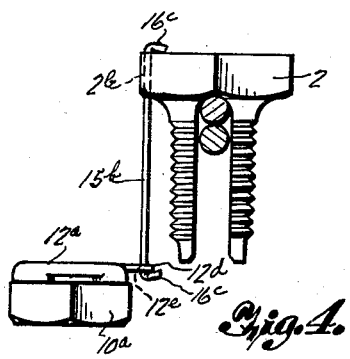

Figure 4 is a view similar to that of Figure 3, with the nut and washer assembly removed from the keeper and swung aside for the admission of wires which are shown in section.

Figure 5:
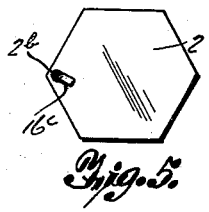

Figure 5 is a top plan view of the assembly of Figure 3.

Figure 6:
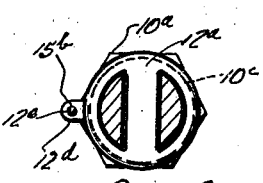

Figure 6 is a section on the line 6—6 of Figure 3.

Figure 7:
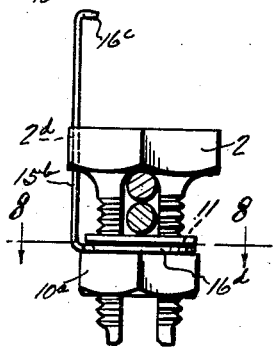

Figure 7 is a side elevation of still another modification of the invention, the stiff pin of the form of Figures 3 and 4 being shown here also as having a slidable connection thru the head of the keeper, the opposite end of the pin however being shown as freely looped within a race formed around the boss of the nut itself, in lieu of being passed freely thru an apertured ear extended from the washer, as represented in Figure 3.

Figure 8:
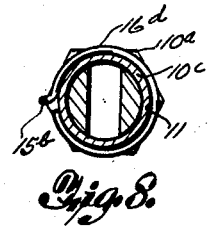

Figure 8 is a section on the line 8—8 of Figure 7.

Figure 2:
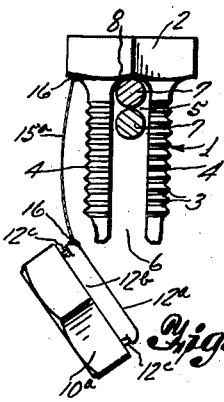
Figure 2 is a view similar to that of Figure 1, the nut and washer assembly being removed from the keeper as for the admission of wires into the medial slot of the keeper, the wires being represented in cross section.
Figure 9:
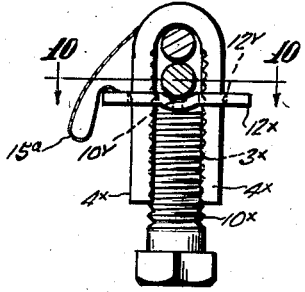

Figure 9 is a side elevation of a form of connecter embodying a bifurcated or U-shaped keeper or keeper lug corresponding generally to the bolt-like element of the other forms, except that the legs thereof are segmentally threaded upon their interior faces or sides instead of exteriorly, to form a screw-way, the washer in this case being slotted to slidably engage the legs and being pivotally connected medially to a press-screw adapted to threadedly engage the screw-way of the keeper, the connecting wire or link however serving to connect the washer to the head of the keeper in exactly the same manner as in the representations of Figures 1 and 2.

Figure 10:
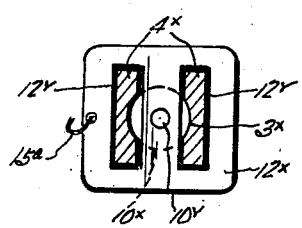

Figure 10 is a section on the line 10—10 of Figure 9.

As represented in the drawing, the invention is shown as applied to certain conventional forms of wire connecters, the same including a bolt-like member or keeper 1 formed with a faced head 2 and a bifurcated body portion segmentally screw threaded either exteriorly or interiorly as represented at 3. Thus there are provided the threaded sides or legs 4 spaced apart by the intermediate wire reeciving slot 5 which opens out thru one end of the keeper, as shown at 6, for the admission of wires 7 to the seat 8 at the closed or headed end of the keeper. As represented in Figures 1 and 2 the legs 4 are threaded exteriorly and a nut 10a is provided for threadedly engaging the same over the slot 5. As here shown this nut is formed with the integral, annular boss 10c upon its predetermined inner face as mounted upon the keeper, and this boss in turn is formed with the exterior, lateral groove or race 11. An annular, cupped washer or bearing element 12a, having the deeply turned rim or skirt 12b, is freely and rotatably seated over the boss 10c, the ring of the washer being adapted to freely engage or embrace the legs of the keeper 1, and there being lips or tangs 12c struck from the skirt 12b and pressed or pinched freely into the race 11, whereby the nut and washer are rotatably anchored together.

Nothing patentable is here claimed in respect of the foregoing structural features, and it will also be understood that while certain particular forms of keepers and of nut and washer assemblies or their equivalents, are here described and shown, any other desirable forms of such elements might be employed in lieu thereof. My invention as such resides in the provision of means, arranged and extended exteriorly of the keeper, for operatively connecting the elements together in a unitary assembly, that is for connecting the nut or equivalent element to the keeper in an operative manner. As shown in Figures 1 and 2 this is accomplished by means of a flexible wire connection or link 15a extended exteriorly of the keeper 1, the ends thereof being soldered at 16 to the washer or bearing element 12a and the head 2 respectively. Or, in lieu of soldering the ends of the wire, these ends might be secured to the elements in any other desirable or conventional manner. The flexible link 15a is of course long enough to permit the complete removal of the nut and washer assembly from the end of the keeper, as represented in Figure 2. Thus the elements of the connecter are all permanently and operatively joined together in a unitary assembly. In the use of this assembly the wires 7 which are to be joined are passed thru the opening 6 and slot 5 of the keeper to the seat 8, after which the nut and washer are replaced upon the keeper and turned up tightly to the position shown in Figure 1.

As shown in Figures 3 and 4, the margin of the laterally expanded head 2 is pierced with an aperture 2b and the washer 12a has a laterally extended tab or ear 12d which is likewise pierced with an aperture 12e aligned with the aperture 2b. A stiff pin 15b is then passed slidably thru the apertures 2b and 12e and have their extremities hooked over as shown at 16c, whereby the elements are unitarily joined. The pin 15b is of course long enough to allow the removal of the nut and washer from the keeper, after which they may be swung aside as shown in Figure 4 for the admission of the wires.

As shown in the Figures 7 and 8, the washer 12a is dispensed with entirely, and the corresponding end of the pin 15b forms a perpendicularly extended loop 16d which is freely seated within the race 11 of the boss of the nut 10a, whereby the nut may be operatively rotated upon the keeper with the pin remaining stationary, in manner similar to the other forms shown. Thus in this arrangement the nut is operatively connected directly to the keeper and without the intervention of the rotatable washer of the other forms.

In Figures 9 and 10 is shown a form of connecter embodying a U-shaped keeper, the legs thereof being threaded upon their inner or interior faces to form a screw way as represented at $3^\times$, and a press-screw $10^\times$ replaces the nut 10a of the preceding forms. A rectangular press block $12^\times$ replaces the washer 12a of the other structures, the same being slotted marginally as shown at 12y for freely engaging the legs $4^\times$ of the keeper, and being pivotally connected medially with the inner end of the screw $10^\times$, as shown at 10y, whereby the screw may be turned into the threaded passage $3^\times$ as the press block engages the legs of the keeper. In this embodiment of the connecter, the flexible link 15a is again employed for joining the elements, in the same manner as represented in Figures 1 and 2 for the form of connecter there shown, and this present form of connecter is merely shown here in order to illustrate the applicability of the invention to various forms of connecters. Likewise the forms of links shown in Figures 3 and 7 might be readily adapted to the form of connecter of Figure 9. Moreover it is obvious that any form of bearing element or washer, as well as any desirable form of nut or press element or screw might be employed in lieu of either of the forms here shown and described, and while I have herein shown and described certain preferred structural forms and embodiments of my invention, it is understood that I am not to be strictly limited thereto but that I may modify or vary the various structural details as may seem expedient in practice, not departing however from the spirit of the invention as defined in the appended claims.

I claim:

1. A wire connecter, the same comprising in combination an elongated, bifurcated keeper including spaced legs connected at one end by a laterally expanded head portion having an aperture thru one margin thereof, the outer sides of the legs being segmentally screw-threaded and the spacing thereof providing a wire receiving slot, a tapped nut for engaging the threaded legs of the keeper the predetermined inner portion of the nut being turned and grooved laterally to form a race, and a pin slidably passed at one end thru the marginal aperture of the head portion of the keeper and arranged against removal therefrom, the opposite end of the pin being extended perpendicularly in the form of a loop freely disposed within the said race of the nut, whereby the nut may be operated upon the keeper in conventional manner and may be withdrawn from the keeper and swung aside pendently upon the pin for the admission of wires into the wire receiving slot of the keeper.

2. In a wire connecter including an elongated, bifurcated keeper having spaced legs connected at one end by a laterally expanded head portion having an aperture thru one margin thereof, the outer sides of the legs being segmentally screw threaded and the spacing thereof providing a wire receiving slot, and a tapped nut for engaging the threaded legs of the keeper the predetermined inner portion of the nut being formed with a boss having an exterior and lateral race formed therein, a pin slidably passed at one end thru the marginal aperture of the head portion of the keeper and arranged against removal therefrom, the opposite end of the pin being looped perpendicularly and freely seated within the said race of the nut, whereby the nut may be operated upon the keeper in conventional manner and may be withdrawn from the keeper and swung aside pendently upon the pin for the admission of wires into the wire slot of the keeper.

3. A wire connecter, the same comprising in combination an elongated, bifurcated keeper including spaced legs connected at one end by a laterally expanded head portion having an aperture thru one margin thereof, the outer sides of the legs being segmentally screw-threaded and the spacing thereof providing a wire receiving slot, a tapped nut for engaging the threaded legs of the keeper, a pin slidably passed at one end thru the marginal aperture of the head portion of the keeper and arranged against removal therefrom, the opposite end of the pin being extended adjacent the nut, and means for so connecting the latter end of the pin to the nut, that the nut may be threaded upon the keeper in conventional manner and may be withdrawn from the keeper and swung aside upon the pin for the admission of wires into the wire receiving slot of the keeper.

4. In a wire connecter including an elongated, bifurcated keeper having spaced legs connected at one end by a laterally expanded head having an aperture thru one margin thereof, the outer sides of the legs being segmentally screw threaded and the spacing thereof providing a wire receiving slot and including a tapped nut for engaging the threaded legs of the keeper, the combination of a pin passed slidably at one end thru the marginal aperture of the head and arranged against removal thereat, the opposite end of the pin being extended in parallelism with the axis of the keeper to a point transversely opposite the nut, and means for rotatably connecting the nut to that end of the pin, so that the nut may be operated upon the keeper in conventional manner, and may be unthreaded from the keeper and swung aside upon the pin for the admission of wires into the wire receiving slot of the keeper.

5. A wire connecter comprising in combination an elongated keeper having spaced legs connected at one end by a laterally expanded head having an aperture thru one margin thereof, the outer sides of the legs being segmentally screw-threaded and the spacing thereof constituting a wire engaging slot, a tapped press element for threadedly engaging the legs of the keeper over the slot, a bearing element rotatably mounted upon the press element and adapted to slidably contact the legs of the keeper, the said bearing element having an apertured tab extended laterally therefrom in longitudinal alignment with the aperture of the lateral margin of the head, and a pin passed slidably thru the aligned apertures of the head of the keeper and the tap of the bearing element and arranged at its extremities against removal therefrom.

JAMES A. WEAVER, Jr.